United States Patent [19]
Gallimore
[11] Patent Number: 4,851,071
[45] Date of Patent: Jul. 25, 1989

[54] METHOD FOR MAINTAINING PRECISE SUCTION STRIP POROSITIES

[75] Inventor: Frank H. Gallimore, Anaheim, Calif.

[73] Assignee: The United States of America as represented by the Administrator of the National Aeronautics and Space Administration, Washington, D.C.

[21] Appl. No.: 223,124

[22] Filed: Jul. 22, 1988

[51] Int. Cl.[4] .............................................. B32B 31/16

[52] U.S. Cl. .................................... 156/344; 244/133; 427/272

[58] Field of Search ............................... 156/291, 344; 244/117 A, 123, 126, 130, 133; 427/272, 282

[56] References Cited

U.S. PATENT DOCUMENTS 3,046,175 7/1962 Bowman .
3,063,873 11/1962 Saroyan .
3,139,352 6/1964 Coyner .
3,212,949 10/1965 Thompson .
4,122,225 10/1978 Holmstrom et al. .
4,269,882 5/1981 Carrillo et al. .
4,587,186 5/1986 Nakamura et al. .
4,780,159 10/1988 Riel ................................ 156/344 X

*Primary Examiner*—Robert A. Dawson
*Attorney, Agent, or Firm*—George F. Helfrich; John R. Manning; Charles E. B. Glenn

[57] ABSTRACT

A masking method which precisely controls porosity of a perforated titanium sheet having suction strips of a defined width includes separately taping suction strip areas and bonding land areas and then applying a coating of maskant material over the tape in the vicinity of the suction strips. Gaps formed on opposite sides of the suction strips are filled with the same maskant material and the bonding land tapes are removed after the masking material is semi-cured. The entire aerodynamic surface of the titanium sheet is covered with strips of tape and overlapping pieces of tape form seams in the vicinity of the bonding surface margins.

20 Claims, 4 Drawing Sheets

POROSITY CHECKS-BEFORE & AFTER BONDING COMPOSITE PADS TO PERF TI SHEET

METHOD FOR MAINTAINING PRECISE SUCTION STRIP POROSITIES

ORIGIN OF THE INVENTION

The invention described herein was made in the performance of work under a NASA Contract and is subject to the provisions of Section 305 of the National Aeronautics and Space Act of 1958, as amended, Public Law 85-568 (72 Stat. 435, 42 U.S.C. 2457).

BACKGROUND OF THE INVENTION

1. Field of the Invention

This invention is related generally to laminar flow control (LFC) panel construction and, more particularly, to a method that protects suction strips on perforated titanium sheets during fabrication processes.

2. Description of the Related Art

Perforated titanium sheets or skins are known for use in the construction of aerodynamic structures, including airfoils. The perforations are small holes in the airfoil surface through which suction is applied to achieve laminar flow control.

Precise control of areas of the perforated titanium sheet known as suction strips is required to achieve successful laminar flow control in flight environments. The exact widths of the suction strips must be maintained to achieve design suction porosities throughout the fabrication processes during which perforated skins are bonded to sub-structures including trapezoidal fluted composite structures. The skins or sheets are provided with electron beam perforated holes, typically with a 0.0025 inch diameter at the airfoil surface and a 0.025 inch center.

During bonding these perforated holes are exposed to harsh chemical etchant solutions. Moreover, when bonding composite pads with adhesive films to the perforated skins and substructures, high heating temperatures and pressures occur during the autoclave curing cycles which cause resin and adhesive to flow and wick into the perforated holes. While these fabrication processes are needed for strong bond lines, they can be detrimental to the laminar flow control panel suction strip porosities because of unpredictable margins and hole size changes. Many of the holes can become plugged during the bonding process or enlarged by harsh etchants. Any changes in hole geometry can potentially have an adverse effect on laminar flow control.

Varieties of masking materials and masking techniques are known for protecting a variety of surfaces. U.S. Pat. No. 3,046,175 to Bowman discloses a method of forming a curved surface on a honeycomb core using a plaster mold. A masking step uses mask and release layers which coat the surface of the mold prior to insertion of the honeycomb material into the mold. A non-water soluble "hot melt" material is pored into the other end of the honeycomb material and solidified. Afterwards, the plaster mold is dissolved so that the exposed portion of the honeycomb material, down to the mask and release layers, can be dissolved in an etching solution. Finally, the solidified hot melt is pulled out of the honeycomb material and the remaining mask layer is heated in a vacuum to soften the mask. Jets of air are then directed into the honeycomb to dislodge the mask. While Bowman teaches a mask and release layer, the masking material is not used to protect small diameter apertures such as those used for laminar flow control. Moreover, since the masking materials described in Bowman are thermoplastic instead of thermosetting, they are not used in a fabrication process which involves high temperatures used to cure composite structures.

U.S. Pat. No. 3,139,352 to Coyner discloses a masking method which uses a telomere of tetrafluoroethylene as a masking material. The masked surfaces are non-aerodynamic and include glass and bright metal fittings on automobiles and boats, handles, and drawer-pulls.

U.S. Pat. No. 3,212,949 to Thompson discloses an identification plate formed by masking a surface with a continuous perforated sheet. Strips of the sheet are removed in selected areas to enable painting or coating of the surface with material contrasting in color or reflectivity with that underlying the mask. The remainder of the mask is removed to expose an identification pattern.

U.S. Pat. No. 4,269,882 to Carrillo et al. discloses a perforated sheet bonded to a porous fibrous material on one side. The opposite side is masked by heavy paper using an adhesive which clings to the paper leaving the surface substantially free of adhesive when the heavy paper is removed. While the paper is in place, an anti-wetting solution is applied to the porous fibers material.

U.S. Pat. No. 4,587,186 to Nakamura et al. discloses a mask element for selective sand blasting to produce a pattern-engraved article corresponding to the pattern of the mask. The mask is formed on an unpatterned retainer film layer which in turn is formed on a support layer. The mask is sticky and adheres to both the surface of the object to be patterned and to the retainer film when pressure is applied against the support film. Subsequently, the support film can be stripped off without effecting adhesion between the retaining layer and the mask. Ultimately, the mask is removed by combustion or application of a solvent.

None of the above references address the problem of maintaining laminar flow control precise suction strip porosities and none teaches or suggests a method for masking a perforated aerodynamic surface.

SUMMARY OF THE INVENTION

An object of the invention is to provide a method of maintaining precise suction strip widths to achieve designed suction porosities throughout subsequent fabrication processes.

Another object of the present invention is to provide a method of preventing exposure of holes in perforated sheets to harsh chemical etchant solutions during priming and etching processes which precede bonding.

Another object of the present invention is to provide a method for preventing resin and adhesives from flowing and wicking into holes in perforated sheets during bonding of composite pads with adhesive film to the perforated sheets.

Another object of the present invention is to provide a method of fabricating composite structures with strong bond lines without adversely effecting laminar flow control panel suction strip porosities so that throughout the panel fabrication processes the designed suction porosity is maintained.

The above mentioned objects are attained by providing a method of masking a perforated sheet having an inner surface, an outer aerodynamic surface and parallel spaced apart suction strips, the masking method including the steps of masking the inner surface with tape, masking the outer aerodynamic surface with tape, coating the inner surface tape with a maskant material, and removing a portion of the inner surface tape corresponding to bonding land areas and leaving the remaining portion over the suction strips. The coating step includes applying a first coating of maskant material, at least partially drying the first coating, and then applying a second coating of maskant material.

When manufacturing an aerodynamic structure using a perforated sheet having an inner surface and an outer aerodynamic surface and parallel spaced suction strips, the preferred method includes masking the inner surface of the perforated sheet with tape, masking the outer aerodynamic surface of the perforated sheet with tape, coating the inner surface tape with a maskant material, removing a portion of the inner surface masking tape corresponding to bonding land areas, bonding the perforated sheet to a composite structure at the bonding lands, and after bonding, removing the remaining masking tape from both surfaces of the perforated sheet. Masking the inner surface and coating the inner surface tape comprise covering areas of the inner surface corresponding to the suction strips with suction strip tape, covering areas of the inner surface corresponding to the bonding land with bonding land tape and leaving a relatively small gap between each juxtaposed suction strip tape and bonding land tape, and coating each suction strip tape and the gaps formed on opposite sides of the suction strip tape with a maskant material. Preferably, the bonding land tape is removed while the maskant material is semi-cured. Edges of the suction strip areas are aligned with edges of the suction strip tape. During the coating step, a first coating of maskant material is applied to an upper surface of the suction strip tape and fills the gaps formed on opposite sides of the suction strip tape. After partially drying the first coating, a second coating is applied on top of the first coating using the same maskant material. The maskant material is applied in liquid form and is curable at room temperature to be removed in solid or tacky form.

When covering the aerodynamic surface, a plurality of strips of aerodynamic surface tape are juxtaposed to have overlapping edges forming seams that are centered on the bonding surface margins of the perforated sheet. The only requirement is that the seams not fall on the suction strips, although it is preferable to center them between margins of the bonding land areas.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

Figure 1:
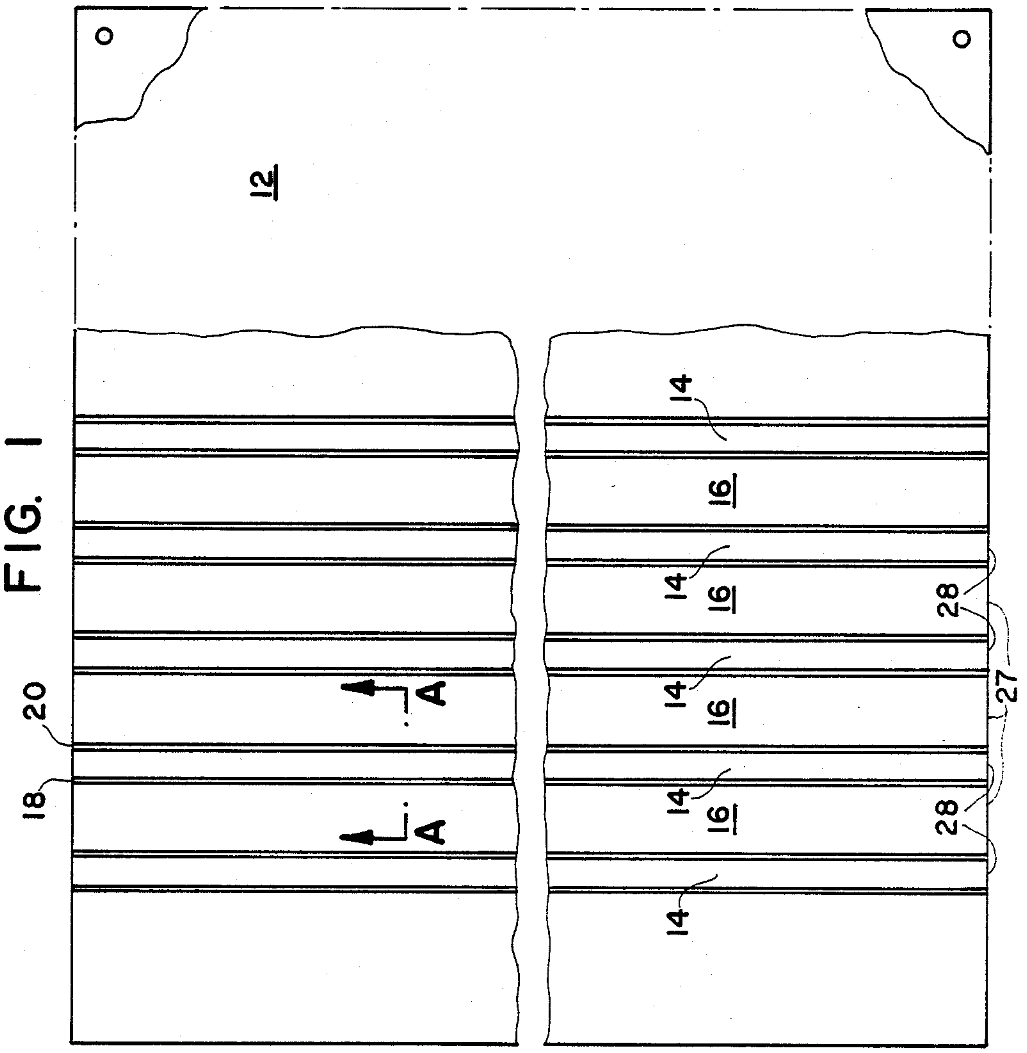
FIG. 1 is a top plan view of a perforated sheet with alternating suction strip tapes and bonding land tapes.
Figure 3:
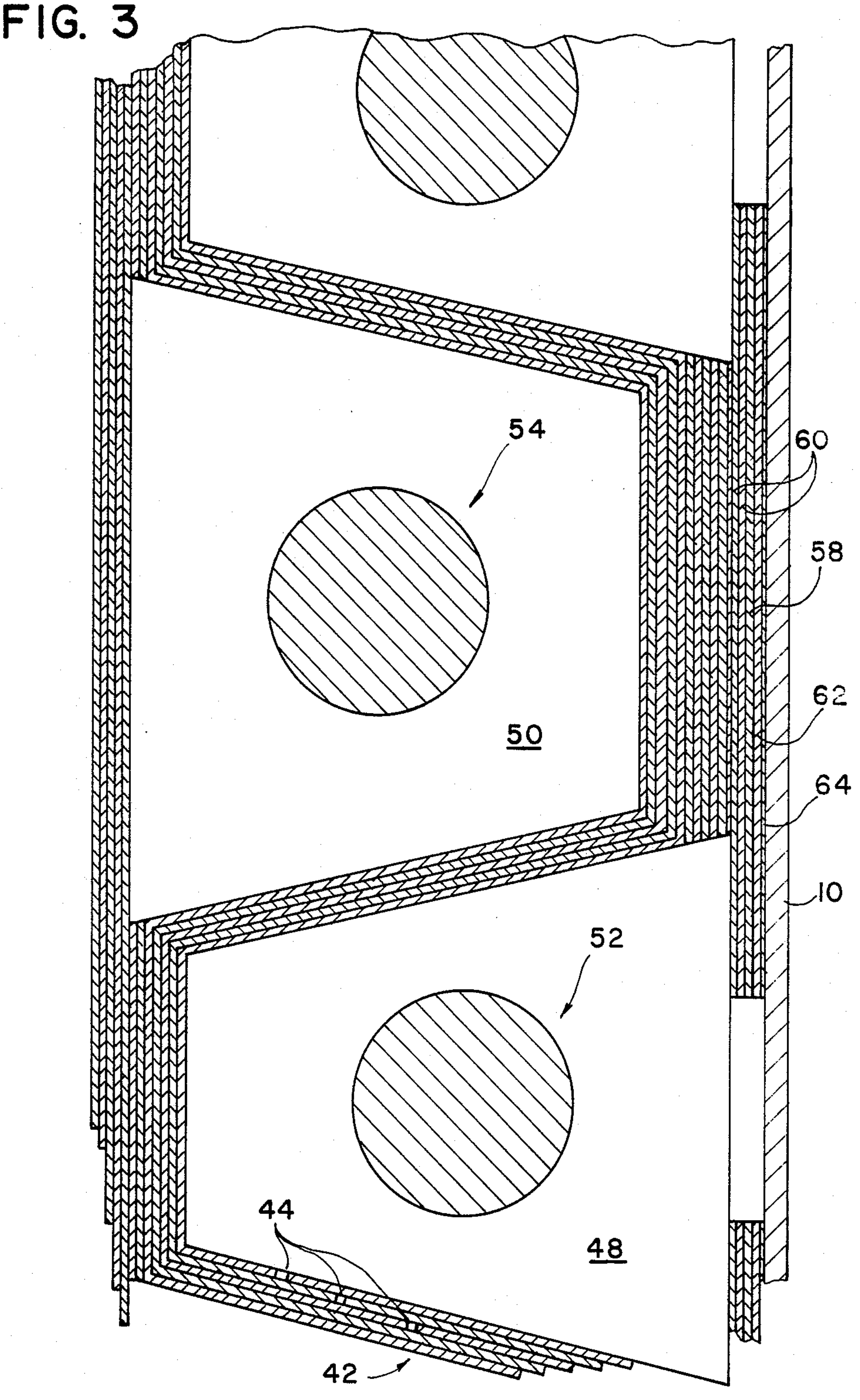
Figure 4:
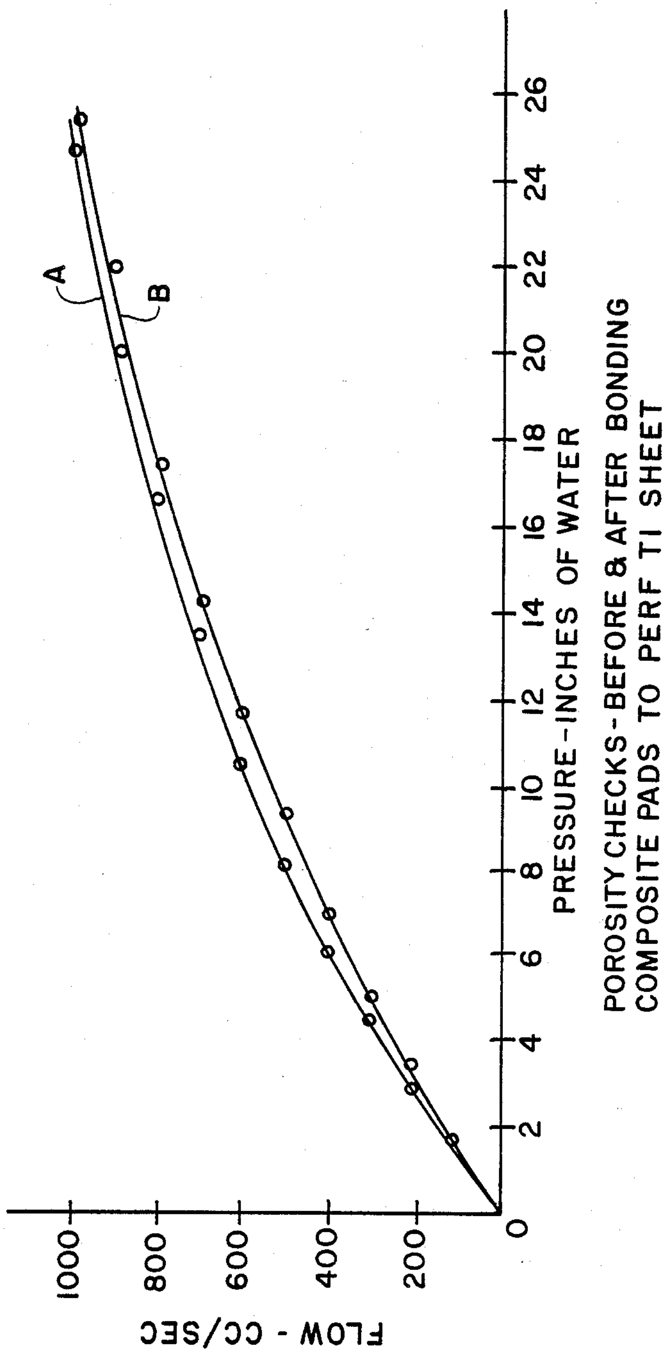

FIGS. *2a–2d* are enlarged cross-section views taken along line A—A of FIG. 1, showing sequential steps of the preferred embodiment;

FIG. 3 is a cross-sectional view of the preferred embodiment showing bonding of the perforated sheet to a composite trapezoidal sub-structure; and FIG. 4 is a graph comparing pre-masking and post-masking suction porosities.

DESCRIPTION OF THE PREFERRED EMBODIMENTS

In FIG. 1, the numeral 10 refers generally to a perforated sheet which is used in the construction of aerodynamic structures, such as an airfoil. The perforated sheet has upper surface 12 and an opposite, aerodynamic surface (not shown in FIG. 1). FIG. 1 shows a series of alternating strips of suction strip tape 14 and bonding land tape 16, with each bonding land tape being disposed between two adjacent suction strip tapes. Gaps 18, 20 are formed on opposite sides of the suction strip tape by providing a space between each juxtaposed suction strip tape 14 and bonding land tape 16. Suction strip areas 28 underlie each suction strip tape 14. Bonding lands or bonding land areas 27 underlie each bonding land tape 16. A bonding land is a surface area of attachment for attaching the sheet to other structures.

Referring now to FIGS. *2a–2d*, an enlarged view of the perforated sheet 10 is shown in detail. The sheet has a plurality of perforations 22, each tapered in diameter so that a smaller opening appears at the aerodynamic outer surface 24 while a larger opening occurs at the opposite inner surface 12. Both surfaces are shown prior to masking in FIG. *2a*. Prior to implementing the masking method of the present invention, the perforated sheet may be prepared by sanding and steam cleaning.

In FIG. *2b*, a perforated sheet 10 inner surface 12 is masked with suction strip tapes 14 which are flanked on opposite sides by bonding land tapes 16. Gaps 18, 20 are provided on opposite sides of the suction strip tape 14. Suction strip tape 14 is symmetrically disposed about a center line 26 of the underlying suction strip 28. Underlying suction strip 28 has a certain width defined by broken lines 29, 31, and represents an area of the sheet 10 between two adjacent bonding land areas. The overlying suction strip tape 14 exactly coincides in width to the width of the suction strip 28. In other words, side edges of the suction strip 28 are coincident with side edges of the suction strip tape 14.

After applying all necessary suction strip tapes 14 and bonding land tapes 16, a maskant material is applied as a first coating 30 and a second coating 32. Both coatings 30, 32 are applied generally in the region of each suction strip tape 14 and the gaps 18, 20 formed on opposite sides of each tape 14. Incidental amounts of maskant material may spill out over the bonding lad tapes 16, but it is not intended that the bonding land tape 16 should be covered. The reason for this is that, as shown in FIG. *2c*, each bonding land tape 16 is peeled off and removed from the inner surface 12 after application of the two coatings 30, 32. Therefore, deliberately coating the bonding land tape 16 would be wasteful. The two coatings are considered relatively heavy at about 0.005 inches in thickness each. A preferred maskant material is referred to as ADCOAT, a plastic material which can be painted on and air dried. ADCOAT is used in the chemical milling art. Other suitable plastic maskants may be used instead. The first coating is allowed to dry for 10 minutes before applying the second coating. The bonding land tape is removed preferably about 5 minutes after applying the second coating of maskant material. The maskant material need only be applied to the area of the spaced apart suction strip tape, although it is specifically intended that the gaps formed on opposite sides of the suction strip tape are to be filled with maskant material.

Figure 2A:
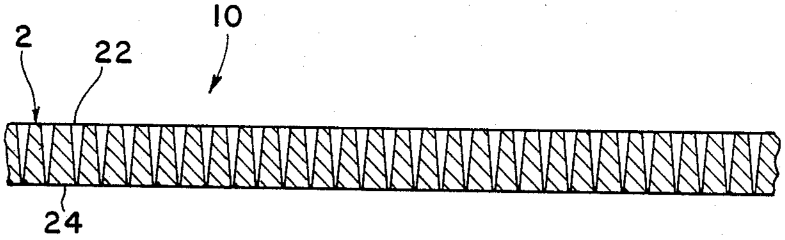
Figure 2B:
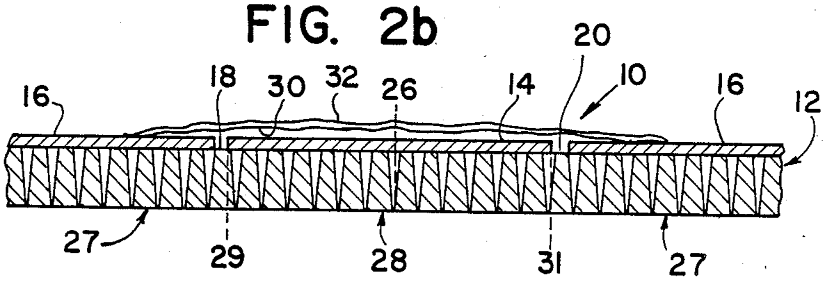
Figure 2C:
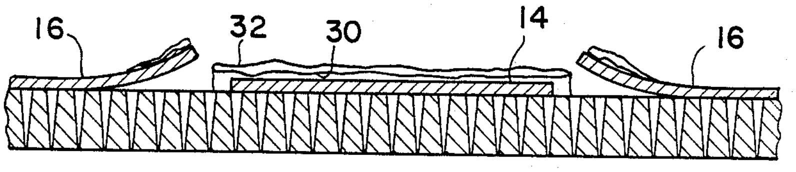
Figure 2D:
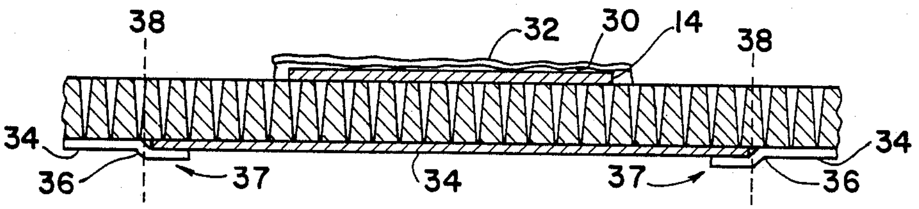

FIG. 2*d* shows that, after removing the bonding land tape 16, the outer aerodynamic surface 24 is masked using a plurality of strips of aerodynamic surface tape 34. Overlapping edges 36 of aerodynamic surface tape 34 form seams 37 centered on bonding surface margins shown by broken lines 38. The arrangement shown in FIG. 2*d* represents the masked condition of the perforated sheet 10 just before further processing in which harsh chemicals and conditions will be exposed to the sheet, having a potentially adverse effect on the porosity of the suction strips. Since the bonding surface margins are to be exposed to chemical processes, they need not be masked. However, since the suction strips have a critically defined porosity to achieve laminar flow control, the suction strip has to be precisely masked. In FIG. 2*d*, the suction strip tape 14 is enveloped by two coatings of maskant material on three sides. This occurs by virtue of the gaps formed on opposite sides of the suction strip tape as previously discussed. The gaps, when filled with maskant material, help prevent harsh chemicals from penetrating the tape 14 which overlies suction strip 28.

In all instances where tape is required, the preferred tape is made of MYLAR. The tape used for the aerodynamic surface 24 should be double backed and should be pressed to make sure that all air pockets are removed.

An alternative application of the invention would be to simply tape the entire aerodynamic surface as described above and mask only the suction strips with tape symmetrically disposed over each suction strip. The width of the tape should be slightly greater than that of the suction strip.

In FIG. 3, a composite sub-structure 40 is shown with the perforated sheet 10 to be bonded thereto. The composite sub-structure 40 includes a trapezoidal fluted structure 42 which may for example include 5 plys of fiberglass webbing 44. The webbing is staggered as shown in order to increase strength since the ends 46 terminate at different locations. The autoclave process includes a suction flute 48 and support flute 50 and mandrels 52, 54 and 56. Curable material 58 is shown to be between two plys of fiberglass 60 and a single ply of fiber glass 62. Adhesive layer 64 is provided between the fiberglass 62 and the perforated sheet 10. When the sub-structure is being cured, rods are placed in all mandrels. When the titanium sheet is bonded to the substructure and cured, rods are placed in the suction flutes in every second flute. Steel tools with rails are used for autoclave curing.

Porosity of the suction strips was tested before processing (no masking) and after processing (with masking). Test results were charted according to FIG. 4, in which pressure is plotted in the X axis and flow rate on the Y axis. A test area was designated and a porosity check was made of the test area. The porosity check provided data generating line A of FIG. 4. After processing test results were plotted and represented by line B of FIG. 4. It is readily apparent that porosity made virtually no change in spite of the harsh bonding and etching processes that were performed on the perforated sheet.

A visual examination of the test area showed very little chemical etchant solution penetrating the small gaps and filled with maskant material. Resin and adhesive flowing and wicking were also isolated from the porous strips. The graph shown in FIG. 4 substantiates the visual inspection by showing after fabrication a very slight decrease in porosity. However, it is more than likely that a slight decrease can be attributed to slight misalignment of the test area, which required a 4 inch diameter test vacuum chamber opening which would have to be exactly placed on the titanium sheet for the before and after results. It is also possible that the difference is attributable to normal tolerances of the test flow meters and manometers of the test console. FIG. 4 shows that the method described herein achieves the objective of maintaining design suction strip porosities throughout the fabrication process.

The step of completely covering the opposite aerodynamic surface includes covering the surface completely with plural strips of aerodynamic surface tape, wherein overlapping edges of aerodynamic surface tape form seams that are centered between margins of the bonding land areas. In other words, the seams should be spaced as far away from the suction strips as possible because of the inherent capacity for seams to allow chemical leakage. The suction strips may range in width from 0.1 to 0.6 inches, or more. The strips of aerodynamic surface tape, suction strip tape and bonding land tape are preferably made of MYLAR, which is a plastic material of high strength made by DuPont. Other plastic tapes may be used so long as they are liquid impervious and nondegradable. Most plastic tapes use light amounts of silicon based adhesive for securing. The aerodynamic surface tape is preferably double-backed and is pressed to remove all air pockets.

The preferred masking method described above is used for a perforated titanium sheet having electron beam perforated holes extending through the sheet with a smaller diameter hole (about 0.0025 inches) at the aerodynamic surface and a slightly larger hole at the other surface.

When bonding the perforated sheet to a substructure or other component, the preferred bonding step includes adhesive bonding in an autoclave process. During that process, a temperature of about 265° F. is achieved for about 90 minutes under a pressure of about 50 psi. Prior to bonding but after masking both surfaces and after removing the bonding land masking tape, the titanium sheet is primed and anodized. Priming and anodizing involves first sanding faying surfaces with a 20 grit disc followed by spraying the sheet with trichloroethylene for about 5 minutes at about 165° to 175° F. followed by exposing the sheet to an etchant for about 10 minutes at about 180° to 200° F. After rinsing with water, the sheet is anodized with phosphoric acid and a voltage level of 12 volts. The color of the sheet should be gray. If not, the previous mentioned steps should be repeated. Other known priming and anodizing techniques may be employed.

After additional rinsing in water, the sheet is dried in an oven at about 125° F. for about 30 minutes. Priming should follow anodizing within two hours and the primer should be sprayed on all faying surfaces for adhesive film bonding. Primed details should be air dried for about 60 minutes and then baked at 250° F. for about 60 minutes maximum. Adhesive bonding should follow priming within 72 hours.

The many features and advantages of the present invention are apparent from the detailed specification, and thus, it is intended by the appended claims to cover all such features and advantages of the method which falls within the true spirit and scope of the invention. Further, since numerous modifications and changes will readily occur to those skilled in the art based on the disclosure herein, it is not desired to limit the invention to the exact construction and operation illustrated and described. Accordingly, all suitable modifications and equivalents may be resorted to falling within the scope and spirit of the invention.

What is claimed is:

1. A method of masking a perforated sheet having an inner surface, an outer aerodynamic surface and parallel spaced apart suction strip areas between adjacent bonding land areas, said method comprising:

masking the inner surface with tape, masking the outer aerodynamic surface with tape, coating the inner surface tape with a maskant material, and removing a portion of the inner surface tape corresponding to the bonding land areas and leaving the remaining portions over the suction strip areas.

2. The masking method of claim 1, wherein the steps of masking the inner surface and coating the inner surface tape comprise:

covering areas of the inner surface corresponding to the bonding land areas with bonding land tape, covering areas of the inner surface corresponding to the suction strip areas with suction strip tape, and forming a relatively small gap between each juxtaposed suction strip tape and bonding land tape, and coating each suction strip tape and the gaps formed on opposite sides of each suction strip tape with a maskant material.

3. The masking method of claim 1, wherein the step of removing a portion of the inner surface tape comprises:

removing the bonding land tape while the maskant material is semi-cured.

4. The masking method of claim 1, further comprising aligning edges of the suction strip areas with edges of the suction strip tape.

5. The masking method of claim 1, wherein the coating step comprises:

applying a first coating of maskant material, at least partially drying the first coating, and then applying a second coating of maskant material.

6. The masking method of claim 2, wherein the coating material is applied over each suction strip tape and into gaps formed on the opposite sides of each suction strip tape.

7. The masking method of claim 1, wherein the step of masking the outer aerodynamic surface comprises:

covering the aerodynamic surface with a plurality of strips of aerodynamic surface tape, wherein overlapping edges of the aerodynamic surface tape strips form seams that are centered between margins of the bonding land areas.

8. The masking method of claim 1, wherein the strips of aerodynamic surface tape, suction strip tape, and bonding land tape are made of plastic material.

9. The masking method of claim 5, wherein the maskant material is a liquid plastic curable at room temperature.

10. The masking method of claim 1, wherein the perforated sheet is made of titanium.

11. A method of manufacturing aerodynamic structures using a perforated sheet having an inner surface and an outer aerodynamic surface, and parallel spaced suction strip areas between adjacent bonding land areas, said method comprising:

masking the inner surface of the perforated sheet with tape, masking the outer aerodynamic surface of the perforated sheet with tape, coating the inner surface tape with a maskant material, removing a portion of the inner surface masking tape corresponding to the bonding land areas, and leaving the remaining portion over the suction strip areas, bonding the perforated sheet to a composite structure at the bonding land areas of the perforated sheet, and after bonding, removing the remaining tape from both surfaces of the perforated sheet.

12. The manufacturing method of claim 11, wherein the steps of masking the inner surface and coating the inner surface tape comprise, covering areas of the inner surface corresponding to the bonding land areas with bonding land tape, covering areas of the inner surface corresponding to the suction strip areas with suction strip tape, and leaving a relatively small gap between each juxtaposed suction strip tape and bonding land tape, and coating each suction strip tape and filling the gaps formed on the opposite side of each suction strip tape with a maskant material.

13. The manufacturing method of claim 12, wherein the step of removing a portion of the inner surface tape comprises, removing the bonding land tape while the maskant material is semi-cured.

14. The manufacturing method of claim 12, further comprising aligning edges of the suction strip areas with edges of the suction strip tape.

15. The manufacturing method of claim 12, wherein the coating step comprises, applying a first coating of maskant material, at least partially drying the first coating, and then applying a second coating of maskant material.

16. The manufacturing method of claim 15, wherein the coating material is applied over the suction strip tape and into the gaps formed on the opposite sides of the suction strip tape.

17. The manufacturing method of claim 11, wherein the step of masking the outer aerodynamic surface comprises, covering the aerodynamic surface with plural strips of aerodynamic surface tape, wherein overlapping edges of aerodynamic surface tape strips form seams that are centered between margins of the bonding land areas.

18. The manufacturing method of claim 11, wherein the perforated sheet is made of titanium.

19. The manufacturing method of claim 11, wherein the bonding step comprises adhesive bonding in an autoclave process.

20. The manufacturing method of claim 11, further comprising, prior to bonding but after masking both surfaces, and after removing the bonding land tape, priming and anodizing the perforated sheet.

* * * * *